United States Patent Office 3,429,812
Patented Feb. 25, 1969

3,429,812
METHOD OF PREPARING LUBRICATING OIL CONCENTRATE CONTAINING CALCIUM SALT OF ALKYLPHENOL - FORMALDEHYDE - DIAMINOALKANE CONDENSATION PRODUCT
Doris Kivelevich and Louis E. Ruidisch, Fishkill, N.Y., assignors to Texaco Inc., New York, N.Y., a corporation of Delaware
No Drawing. Filed Sept. 26, 1966, Ser. No. 581,748
U.S. Cl. 252—42.7          10 Claims
Int. Cl. C10m 1/54, 1/32

ABSTRACT OF THE DISCLOSURE

A method of producing improved lubricating oil concentrates containing the normal, overbased, or $CO_2$ overbased calcium salt of alkylphenol-formaldehyde-diaminoalkane condensation product comprising contacting said condensation product in the presence of lube oil with a calcium alcoholate or a mixture of calcium carbide and alcohol, alternatively treated with carbon dioxide, thereby forming useful oxidation and corrosion inhibitors and detergent-dispersants.

---

This invention relates to a method of producing improved lubricating oil concentrates containing the calcium salt of 2:2:1 mole ratio alkylphenol-formaldehyde-diaminoalkane condensation product hereafter described for convenience as the calcium salt of N,N'-bis(2-hydroxyalkylbenzyl)diaminoalkane.

In regard to the structural formulas hereinafter described, the exact structure of the Mannich base reactant, i.e., the 2:2:1 mole ratio condensation product of alkylphenol - formaldehyde - diaminoalkane is not positively known. However, it is the product resulting from the reaction of a mixture of its three constituents at elevated temperature (e.g., 100–200° F., followed by stripping, e.g., up to 300° F.) wherein said condensation product is formed together with water as a by-product. The condensation product has been assigned herein a theoretical structure in order to render the description of the invention more clear. Therefore, the recitation of structure and nomenclature in respect to said condensation product and its calcium salt derivative is intended in no way to restrict the condensation product and its calcium salts to the particular structure described.

The calcium salts in the concentrates of the invention are useful as oxidation and corrosion inhibitors in railway diesel oils and further function as detergent dispersants in other mineral lubricating oils such as crankcase oils. In order to facilitate their introduction into the mineral and synthetic mineral lubricating oils, they are advantageously introduced in the form of a lubricating oil concentrate containing between about 10 and 90 weight percent of the calcium salt.

In one method the calcium salt was prepared by metathetical reaction such as reacting the N,N'-bis(2-hydroxyalkylbenzyl)diaminoalkane with sodium hydroxide to form the sodium salt and then reacting the resultant sodium salt with calcium chloride thereby forming the calcium salt derivative and sodium chloride by-product. This method is unsatisfactory in that it requires a lengthy reaction time and requires expensive corrosion resistant materials to resist corrosion caused by the chloride ion.

Another method of producing the calcium salt is to react the N,N' - bis(hydroxyalkylbenzyl)diaminoalkane directly with lime. Although this method produced desired calcium salt product, it has the undesirable feature of relatively low yield.

The aforementioned procedures are also not particularly suited for preparing overbased calcium salt containing lube oil concentrates, that is, concentrates where the calcium metal ratio therein is greater than 1. By the term "calcium metal ratio" it is meant the ratio of a number of equivalents of calcium in the lube oil concentrate per equivalent of residue of the N,N' - bis(2-hydroxyalkylbenzyl)diaminoalkane.

We have discovered, and this constitutes our invention, a method of producing lubricating oil concentrates containing normal and overbased calcium salts of bis(hydroxyalkylbenzyl)diaminoalkanes in a relatively rapid manner, in good yields and essentially under non-corrosive conditions which permits the use of less expensive apparatus materials.

More specifically, we have discovered a method of preparing a lube oil concentrate containing a (e.g., at least about 10 wt. percent) calcium salt of bis (2-hydroxyalkylbenzyl)-1,2-diaminoalkane characterized by the formula:

$$R^1\text{—}\underset{R^2}{\text{Ar}}(\text{O—Ca—O})\text{—CH}_2\text{NHR}^5\text{NHCH}_2\text{—}\underset{R^3}{\text{Ar}}\text{—}R^4 \cdot X\text{Ca(OA)}_2$$

where $R^1$ and $R^4$ are hydrogen or monovalent saturated aliphatic hydrocarbon radicals (alkyl) of from 1 to 30 carbons, $R^2$ and $R^3$ are alkyl of from 4 to 30 carbons and $R^5$ is polymethylene of from 2 to 6 carbons, A is $R^6OR^7$— or $R^8$—, $R^6$ is alkyl of from 1 to 3 carbons, $R^7$ is polymethylene of from 2 to 4 carbons, $R^8$ is alkyl of from 1 to 5 carbons, and X is an integer of from 0 to 5 and higher, comprising contacting in the presence of a lubricating oil, preferably under conditions of agitation, a N,N' - bis(2 - hydroxyalkylbenzyl) - 1,2-diaminoalkane characterized by the formula:

$$R^1\text{—}\underset{R^2}{\text{Ar}}(\text{OH})\text{—CH}_2\text{NHR}^5\text{NHCH}_2\text{—}\underset{R^3}{\text{Ar}}(\text{OH})\text{—}R^4$$

where $R^1$, $R^2$, $R^3$, $R^4$ and $R^5$ are as heretofore defined, with calcium carbide and alcohol of the formula A—OH where A is as heretofore defined. The contacting is advantageously conducted at a temperature of between about 50° C. and 180° C. Further, under advantageous conditions, the mole ratio of calcium carbide to N,N'-bis(2-hydroxyalkylbenzyl)diaminoalkane is between about 1:1 and 6:1 and higher and the mole ratio of diaminoalkane reactant to alcohol is between about 1:1 and 1:20 and higher. For calcium metal ratios greater than 1 and up to about 6 and higher the ratio of calcium carbide to diaminoalkane reactant is greater than about 2:1 and up to 6:1 and higher. The amount of lubricating oil employed as the reaction medium is normally less than about 90 wt. percent, preferably between about 40 to 60 wt. percent, based on the reaction mixture.

If desired, inert gas such as nitrogen may be continuously passed into the mixture during all or part of the reaction to facilitate agitation and/or remove any gaseous by-products such as acetylene which present an explosion hazard.

Mole ratios of calcium carbide to diaminoalkane reactant less than about 2:1 favor the production of the normal salt which can be characterized by the theoretical formula:

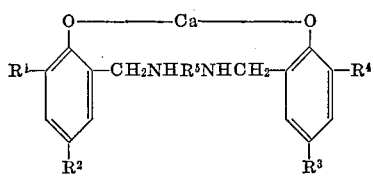

where more ratios greater than about 2:1 favor the production of an overbased calcium salt comple characterized by the theoretical formula:

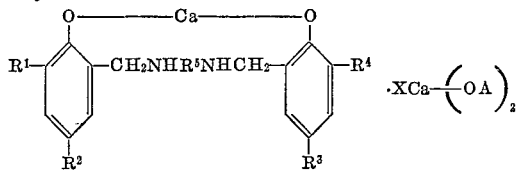

where $R^1$, $R^2$, $R^3$, $R^4$, $R^5$, A and X are as heretofore defined with X being greater than zero and up to 5 and higher.

Under preferred conditions, the contacting comprises first reacting calcium carbide with excess alcohol of the formula A—OH to form an alcohol solution containing the intermediate calcium alkoxide of the formula:

$$Ca(OA)_2$$

where A is as heretofore defined, filtering the resultant intermediate containing reaction mixture to remove any non-colloidal solid materials therefrom and then introducing the calcium alkoxide filtrate containing excess AOH into the N,N'-bis(2-hydroxyalkylbenzyl) diaminoalkane at a temperature of between about 150 and 180° C. Under the most preferred conditions, some of the AOH is continuously removed, e.g., via distillation during the alkoxidediaminoalkane reaction. This particular order of reactant additions appears to give superior results from a final filtration rate and filtration loss standpoint. This has significance in that a filtration procedure is often employed in the purification of the lube oil concentrate product of the invention after removal of residual alcohol from the reaction mixture.

The calcium salt containing lube oil concentrate is isolated from the final reaction mixture by standard means such as distilling off the residual alcohol reactant and by passing an inert gas such as nitrogen therethrough at elevated temperature. The lube oil concentrate residue can then be further purified by filtering, e.g., by passing said residue through a filter bed of finely divided diatomaceous silica to remove non-colloidal particles.

Another embodiment of the method of the invention is the forming of overbased carbonated calcium salts of bis(2-hydroxyalkylbenzyl)diaminoalkane containing lube oil concentrates. This is accomplished by introducing into the reaction mixture $CO_2$ in an overall mole ratio of $CO_2$ to calcium carbide of at least about 2:1 and up to 100:1 and higher during the reaction of the calcium alcoholate and the Mannich base reactant under conditions heretofore described. In this embodiment it is preferable to conduct the $CO_2$ blowing under aqueous conditions, e.g., having between about 1 and 10 wt. percent water in the reaction mixture during $CO_2$ contact. Further, under most preferable conditions the calcium carbide is first reacted with the alcohol to form the corresponding calcium alkoxide complex. The complex is blown with $CO_2$ to form the alkoxide-carbonate complex and then contacted with a lube oil solution of the diaminoalkane reactant and water. The resultant mixture is then further blown with $CO_2$. The lube oil solution ingredient is preferably pretreated with $CO_2$ and most preferably containing between 5 and 25 wt. percent volatile solvent. In the alkoxide-$CO_2$ contact the mole ratio of alkoxide to $CO_2$ employed is desirably at least 1:1 and up to 100:1 or more and the mole ratio of $CO_2$ to complex employed in the final $CO_2$ blowing is also desirably at least about 2:1 and up to 100:1 or more. The overbased carbonated product may be characterized by the following theoretical formula:

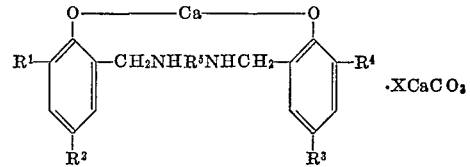

where $R^1$, $R^2$, $R^3$, $R^4$, and $R^5$ are as heretofore defined and X being greater than zero and up to 5 and higher.

The method of the invention is further described by the following theoretical equations wherein the reactants are 2-methoxyethanol, calcium carbide and N,N'-bis(2-hydroxy-5-octylbenzyl)-1,2-diaminoethane.

Normal calcium salt (1)

(2)
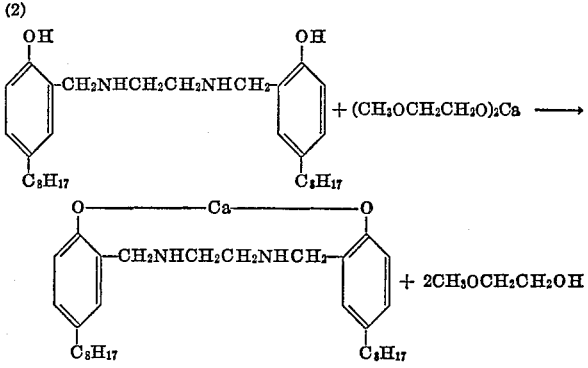

Overbased calcium salt (1)
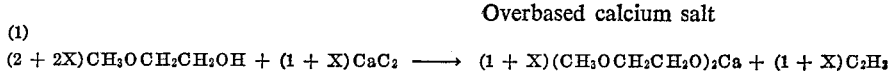

(2)
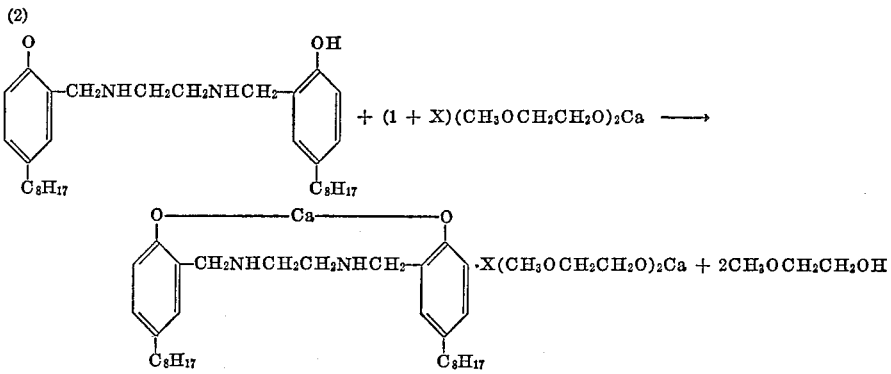

where X is an integer of from above zero to 5 and higher.

CO₂ overbased calcium salt (1)

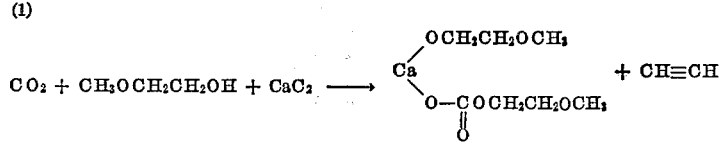

(2)

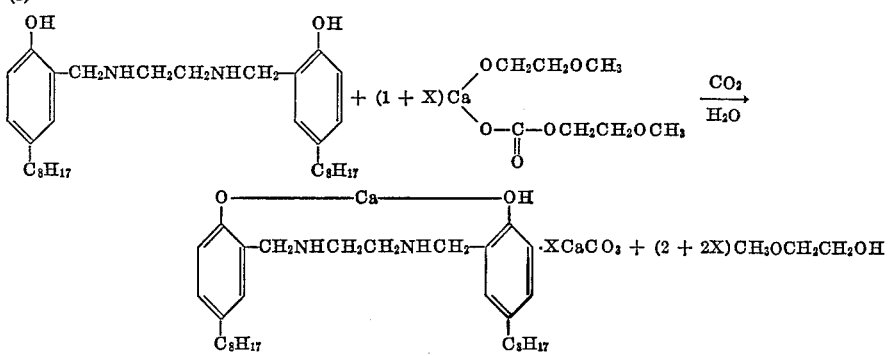

where X is an integer of from above zero to 5 and higher.

Examples of the alcohol reactants contemplated herein are -methoxyethanol, -ethoxyethanol, -methoxypropanol, methanol, butanol and pentanol.

Examples of the N,N'-bis(2-hydroxyalkylbenzyl)diaminoalkane reactants are N,N'-bis(2-hydroxy-5-hexadecylbenzyl)-1,3-diaminopropane, N,N'-bis(2-hydroxy-3,5-dibutylbenzyl)-1,4-diaminobutane and N,N'-bis(2-hydroxy-5-eicosylbenzyl)-1,2-diaminoethane.

Examples of the lubricating oils contemplated herein are the mineral and synthetic lubricating oils having an SUS viscosity between about 50 and 300 at 100° C. Specifically contemplated mineral lubricating oils are the paraffinic and naphthenic mineral lubricating oils. Specific examples of synthetic lubricating oils are the polyalkylene polymers (polypropylene) and the polyoxyalkylene polymers (polyoxypropylene) of lubricating oil viscosity. Further examples are the dicarboxylic acid esters such as the esters of adipic and azelaic acid derived from alcohols such as butyl alcohol, 2-ethylhexyl alcohol and dodecyl alcohol and esters of acid of phosphorus such as diethyl esters of decylphosphonic acid.

In regard to the calcium carbide reactant, its employment in powdered form is preferred, most preferably having a mesh size below about 20 (U.S. Standard), however, calcium carbide particles of an average diameter up to a ¼″ particle and higher prove satisfactory but require substantially greater agitated conditions in the reaction mixture to afford complete contact.

As to the inert volatile solvent preferably employed in the carbonated process embodiment of the invention, examples are liquid hydrocarbons having a boiling point between 50° C. and 150° C. such as benzene, xylene, toluene, isobutane, isoheptane, mixed heptanes, etc.

The following examples further illustrate the invention but are not to be considered as limitations thereof.

Example I

To a two-liter flask (I) fitted with a stirrer, reflux condenser, and thermocouple for temperature control there was charged 75 mls. of 2-methoxyethanol. The methoxyethanol was heated to reflux (124° C.) while passing nitrogen therethrough at a rate of 250 mls./min. The introduction of nitrogen was continued throughout the entire reaction. To the refluxing methoxyethanol there was added over a half hour period 19.2 grams (0.30 mole) of powdered (20 mesh—U.S. Standard) calcium carbide. The resultant mixture was refluxed (124° C.) for 3 hours and upon analysis was identified as a solution of calcium 2-methoxyethoxide and excess 2-methoxyethanol.

To a second two-liter flask of the type described above containing 339 grams of a lube oil solution of N,N'-bis (2-hydroxy-5-$C_{10}$-$C_{12}$ alkylbenzyl) - 1,2-diaminoethane containing 175 grams of naphthenic lubricating oil having an SUS viscosity at 100° F. of about 100, the final reaction mixture of flask (I) was charged at room temperature. The resultant mixture was heated to 177° C. while passing nitrogen therethrough at a rate of 250 mls./min. taking off 2-methoxyethanol as overhead by-product in a total amount of 58 mls. The resultant solution was filtered through a bed of diatomaceous silica at 150° C. under 7 p.s.i.a. giving 318 grams (91 wt. percent yield) of a lube oil concentrate containing about 50 wt. percent of a calcium salt of N,N'-bis(2-hydroxy-5-$C_{10}$-$C_{12}$ alkylbenzyl)-1,2-diaminoethane characterized by the theoretical formula:

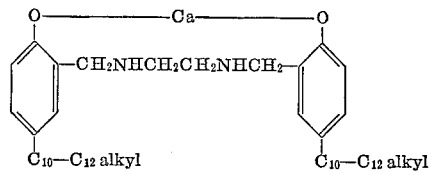

Further analysis of the lube oil concentrate filtrate found the following:

| Tests: | Found |
| --- | --- |
| Sp. gr. 60/60 | 0.9644 |
| Kin. visc. at 210° F., cs. | 74.5 |
| Total base No. | 152 |
| Percent Ca | 2.63 |
| Percent N | 2.5 |

Example II

To a two-liter flask fitted with a stirrer, reflux condenser and thermocouple for temperature control there was charged 329 grams of a lube oil solution (0.25 mole) of N,N' - bis(2-hydroxy-5-$C_{10}$-$C_{12}$ alkylbenzyl)-1,2-diaminoethane containing about 105 grams of naphthenic base petroleum lube oil of an SUS viscosity of 100 at 100° F., 300 mls. of 2-methoxyethanol and 10 grams of additional naphthenic lubricating oil of an SUS viscosity of about 100 at 100° F. The resultant mixture was heated to reflux (124° C.) while passing nitrogen therethrough at a rate of 500 mls./min. To the refluxing mixture there was charged over a half hour period 19.2 grams (0.30 mole) of powdered (20 mesh) calcium carbide while continuing the nitrogen flow. The resultant reaction mixture was refluxed (124° C.) for an additional 3 hour period with nitrogen blowing (250 mls./min.). At the end of the 3 hour period the reaction mixture was heated to 177° C. under stripping conditions with nitrogen blowing at a rate of 250 mls./min. to remove any free 2-methoxyethanol. The residue was filtered through a bed of diatomaceous silica at about 150° C. under about 7 p.s.i.a. yielding 313 grams (90 wt percent yield) of a lube oil concentrate filtrate containing 50 wt. percent of a calcium salt characterized as the calcium salt of N,N'-bis(2-hydroxy-5-$C_{10}$-$C_{12}$ alkylbenzyl)1,2-diaminoethane.

Further analysis of the lube oil concentrate found the following:

| Test | Found | Theory |
|---|---|---|
| Percent Ca | 2.7 | 2.83 |
| Percent N | 2.5 | 1.98 |
| TBN | 138 | 140 |
| Kin. vis. at— | | |
| 100° F., cs | 4,207 | |
| 210° F., cs | 73 | |

Example III

This example illustrates the criticality of employing the alcohol ingredient (AOH) as defined in the method of the invention.

Seven runs were made. Runs A, B and C represent the method of the invention and Runs D, E, F and G represent comparative processes. In Runs A, B and C, 2-methoxyethanol was employed as the alcohol and in Runs D, E and G isoheptane, 2-butoxyethanol and methylisobutyl carbinol were respectively substituted for the 2-methoxyethanol. In Run F initially no alkoxyethanol or substitute therefore was employed and then ethylene glycol was subsequently introduced during the reaction. In respect to the apparatus employed in Runs A, D, E, F and G, the reaction was conducted in a 2-liter flask fitted with a stirrer, condenser, and thermocouple for temperature control.

In regard to Runs B and C, a 2-liter pressure reactor was employed. The calcium carbide utilized had a particle size of less than 20 mesh (U.S. Standard). In those runs where filtration was conducted the filtration consisted of passing the final reaction mixture through a diatomaceous silica precoated 0.1 ft. sq. steam-jacketed filter at 330° F. under 15 p.s.i.g. nitrogen. At the end of the reaction period the final product was analyzed to determine the amount of lube oil concentrate containing calcium salt of N,N'-(2-hydroxy-5-$C_{10}$-$C_{12}$ alkylbenzyl)-1,2-diaminoethane produced.

The reactants employed and their quantities in the various runs are set forth below in Table I:

TABLE I

| Reaction ingredients, g. | Runs | | | | | | |
|---|---|---|---|---|---|---|---|
| | A | B | C | D | E | F | G |
| Ethane reactant [1] | 500 | 500 | 300 | 500 | 750 | 300 | 300 |
| CaC₂ | 24 | 14.4 | 18 | 24 | 36 | 18 | 18 |
| 2-methoxyethanol | 50 | 50 | 50 | | | | |
| 2-butoxyethanol | | | | | 80 | | |
| Isoheptane | | | | 200 | | | |
| None-ethylene glycol (mls.) | | | | | | 2 | |
| Methylisobutyl carbinol | | | | | | | 50 |

[1] N,N'-bis(2-hydroxy-5-$C_{10}$-$C_{12}$ alkylbenzyl)-1,2-diamino-ethane in 100 SUS at 100° F. naphthenic lubricating oil in about a 1:1 weight ratio.

A brief synopsis of the procedure employed in each run is given as follows:

Run A.—The reaction ingredients were charged to the flask. The resultant mixture was heated for about 1 hour to 280° F. (138° C.) and then heated in the range from 246–280° F. for an additional 6 hours. Nitrogen was then passed through the reaction mixture while heating to 350° F. (177° C.) under stripping to remove free 2-methoxyethanol. The residue was filtered and the lube oil filtrate was recovered.

Run B.—The reaction ingredients were introduced into the pressure reactor and the pressure reactor was sealed, heated to 350° F. (177° C.) and maintained at that temperature for 2 hours. The pressure rose to 80 p.s.i.g. The reactor was then vented and the mixture blown with nitrogen at atmospheric pressure and 350° F. (177° C.) for 1 hour to remove 2-methoxyethanol. The product was then filtered and 291 grams of a lube oil filtrate were recovered.

Run C.—The reaction ingredients were charged to a pressure reactor and the reactor was sealed, heated to 350° F. (177° C.) and maintained at that temperature for 2.5 hours. The pressure in the reactor was regulated at 50–60 p.s.i.g. by bleeding during the run. At the end of the 2.5 hour period the reactor was vented and heated for 1 hour at 350° F. (177° C.) under atmospheric pressure while passing nitrogen (0.04 cu. ft./min.) through the reactor contents in order to remove 2-methoxyethanol. The product was filtered and 299 grams of lube oil filtrate were recovered.

Run D.—The reactants were charged to the reactor and refluxed at about 177° C. for 3.5 hours. The reaction mixture foamed badly during this period of time and very litle acetylene by-product was evolved.

Run E.—The reaction ingredients were charged to the flask and heated at 350° F. (177° C.) for 30 minutes. The resultant product was stripped utilizing nitrogen and the stripped residue was filtered and the lube oil filtrate was recovered.

Run F.—The ethane reactant and calcium carbide were charged to the reactor and stirred at 350° F. (177° C.) for 1 hour. Then 2 mls. of ethylene glycol were added and the stirring and heating was continued for an additional period.

Run G.—This run was identical to Run C except methylisobutyl carbinol was substituted for 2-methoxyethanol and the reaction was conducted for a period of only 1 hour.

The results of the foregoing runs are set forth below in Table II:

TABLE II

| Run | Alkoxyalkanol | Percent Conversion [1] |
|---|---|---|
| A | 2-methoxyethanol | 88. |
| B | do | 89. |
| C | do | 103. |
| D | Isoheptane | Very slow reaction. |
| E | 2-butoxyethanol | No reaction. |
| F | None—then ethylene glycol | Do. |
| G | Methylisobutyl carbinol | Do. |

[1] Conversion of reactants to Ca salt characterized as the calcium salt of N,N'-bis(2-hydroxy-5-$C_{10}$-$C_{12}$ alkylbenzyl)-1,2-diaminoethane.

Example IV

This example illustrates a preferred method of producing the lube oil concentrates of the invention as it pertains to pilot-scale operation.

To a first 50-gallon stirred jacketed autoclave there was charged 150 lbs. 2-methoxyethanol and 2.5 lbs. of a diatomaceous filter earth. The 2-methoxyethanol was heated to reflux at 124° C. (255° F.) and nitrogen was passed therethrough at a rate of 5 to 8 cu. ft./hr. To the refluxing 2-methoxyethanol there was charged 25 lbs. of calcium carbide over a period of 2 hours at 116–124° C. (240–255° F.) and after the calcium carbide addition the mixture was continuously refluxed for 3 hours at 124° C. (255° F.) with nitrogen purge as indicated. At the end of the refluxing period the resultant reaction was filtered (diatomaceous earth already present) under a pressure of 5 p.s.i.g. of nitrogen at 95° C. (202° F.). The filtrate was analyzed and determined to be a 2-methoxyethanol solution containing 38.9 wt. percent calcium 2-methoxyethoxide.

To a similar reactor there was charged 140 lbs. of a lube oil solution comprising 54.6 wt. percent N,N'-bis(2-hydroxy-5-$C_{10}$–$C_{12}$ alkylbenzyl)-1,2-diaminoethane in a naphthenic base lubricating oil having an SUS viscosity of about 100 at 100° F. The lube oil solution was maintained at 160° C. (320° F.) and over a period of two hours, 49 lbs. of the calcium ethoxide solution produced in the first autoclave was charged at ambient temperature (no preheat) with 2-methoxyethanol being continuously taken off as overhead. The reactor temperature was maintained near 160° C. (320° F.) for an additional 4 hours. At the end of this reaction period the remaining 2-methoxyethanol was stripped off at atmospheric pressure by passing nitrogen through the reaction mixture at 160° C. (320° F.). The stripping was finished by reducing the pressure to 20 mm. Hg. The stripped residue was polish filtered through paper using a trace of diatomaceous filter earth under a pressure of 10 p.s.ig. of nitrogen at 93° C. (200° F.) and the recovered filtrate was identified as a lube oil concentrate containing 50 wt. percent of the calcium salt characterized as the calcium salt of N,N'-bis(2-hydroxy-5-$C_{10}$–$C_{12}$ alkylbenzyl)-1,2-diaminoethane which upon analysis gave the following results:

| Tests: | Found |
| --- | --- |
| Sp. gr., 60/60° F. | 0.9687 |
| Kin. visc. at 210° F., cs. | 129.1 |
| Total base No. | 145–148 |
| Percent Ca | 2.7 |
| Percent N | 2.3 |

Example V

This example illustrates an embodiment of the invention, namely, the production of a lube oil solution containing a carbonated overbased calcium salt of an N,N'-bis(2-hydroxyalkylbenzyl)diaminoalkane.

To a 12 liter flask fitted with stirrer, reflux condenser and thermocouple for temperature control, there was charged 476 g. (0.5 m.) of a lubricating oil solution comprising 75 wt. percent of N,N'-bis(2-hydroxy-5-$C_{10}$–$C_{12}$ alkylbenzyl)-1,2-diaminoethane and the remainder naphthenic lubricating oil of an SUS viscosity of 100 at 100° F. There was also charged 2500 mls. of benzene. The resultant mixture was heated to 70° C. with $CO_2$ blowing (1500 mls./min.) during which time 5.4 grams of water were added. Following this 48.6 grams of water and 1690 grams (3 mole) of $CO_2$ blown calcium 2-methoxyethoxide characterized by the formula:

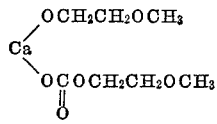

were simultaneously added over ½ hour period to the reaction mixture with $CO_2$ blowing at 1500 mls./min. The resultant mixture was refluxed 3½ hours with $CO_2$ (1500 mls./min.). Benzene and 2-methoxyethanol were then removed from reaction mixture by stripping at 177° F. while blowing with $CO_2$ (1500 mls./min.). The stripped product was filtered in a bed of diatomaceous silica at 150° C. yielding 1029 grams (80% yield) of clarified lube oil concentrate containing 50 wt. percent overbased calcium of a theoretical formula characterization of:

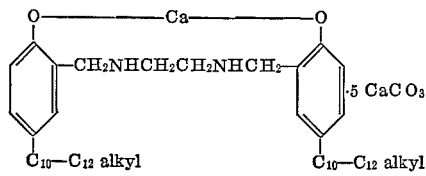

The lube oil concentrate filtrate gave the following analysis:

| Description: | Found |
| --- | --- |
| Percent Ca | 8.1 |
| Percent N | 1.2 |
| Percent $CO_2$ | 9.0 |
| TBN | 282 |
| Kin. visc. (CO) at 210° F. | 1371 |
| Flash point, ° F. | 375 |

We claim:

1. A method of producing a lube oil composition containing a calcium salt reaction product comprising contacting in the presence of a lubricating oil a 2:2:1 mole ratio condensation product of alkylphenol-formaldehyde-diaminoalkane characterized by the formula:

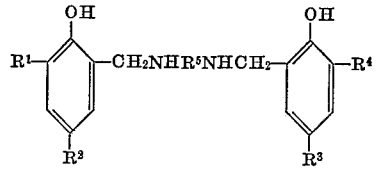

and a member selected from the group consisting of an alcoholate of the formula $Ca(OR^7OR^6)_2$ and a mixture of $CaC_2$ and an alcohol of the formula $R^6OR^7OH$, said contacting being conducted at a temperature between about 50 and 180° C. utilizing a mole ratio of said calcium carbide to said condensation product of at least about 1:1 and a mole ratio of said diaminoalkane compound to alcohol of between about 1:1 and 1:20, where $R^1$ and $R^4$ are hydrogen or alkyl of from 1 to 30 carbons, $R^2$ and $R^3$ are alkyl of from 4 to 30 carbons, $R^5$ is polymethylene of from 2 to 6 carbons, $R^6$ is alkyl of from 1 to 3 carbons, and $R^7$ is polymethylene of from 2 to 4 carbons, said alcoholate prepared by reacting said calcium carbide with said alcohol in excess.

2. A method of producing a lubricating oil composition containing a calcium salt of a 2:2:1 mole ratio condensation product of alkylphenol-formaldehyde-diaminoalkane characterized by the formula:

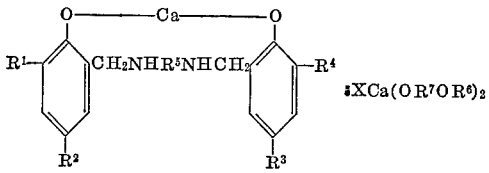

where $R^1$ and $R^4$ are hydrogen or alkyl of from 1 to 30 carbons, $R^2$ and $R^3$ are alkyl of from 4 to 30 carbons, $R^5$ is polymethylene of from 2 to 6 carbons, $R^6$ is alkyl of from 1 to 3 carbons, $R^7$ is polymethylene of from 2 to 4 carbons, and X is an integer of from 0 to 5 comprising contacting in the presence of a lubricating oil, calcium carbide, and alcohol of the formula $R^6OR^7OH$ where $R^6$ and $R^7$ are as heretofore defined and a 2:2:1 mole ratio condensation product of alkylphenol-formaldehyde - diaminoalkane characterized by the formula:

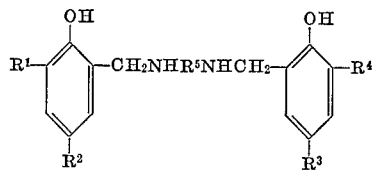

where $R^1$, $R^2$, $R^3$, $R^4$ and $R^5$ are as heretofore defined at a temperature between about 50° and 180° C. utilizing a mole ratio of said calcium carbide to said diaminoalkane compound at between about 1:1 and 6:1 and a mole ratio of said diaminoalkane compound to alcohol of between about 1:1 and 1:20.

3. A method in accordance with claim 1 wherein subsequent to said contacting, any of said alcohol present is separated from said reaction mixture, followed by filtering the result reaction mixture and recovering said filtrate as said lubricating oil composition.

4. A method in accordance with claim 3 wherein said lubricating oil is mineral lubricating oil of an SUS viscosity between about 50 and 300 at 100° F., $R^1$ and $R^4$ are hydrogen, $R^2$ and $R^3$ are $C_{20}$–$C_{12}$ alkyl, said $R^6$ is $CH_3$, said $R^7$ is $CH_2CH_2$, said X is zero to 1 and said mole ratio of said calcium carbide to said condensation product is less than about 2:1.

5. A method in accordance wih claim 3 wherein said lubricating oil is mineral lubricating oil of an SUS viscosity between about 50 and 300 at 100° F., $R^1$ and $R^4$ are hydrogen, $R^2$ and $R^3$ are $C_{10}$–$C_{12}$ alkyl, said $R^6$ is $CH_3$, said $R^7$ is $CH_2CH_2$, said X is at least about 1 and said mole ratio of said calcium carbide to said condensation product is greater than about 2:1.

6. A method in accordance with claim 1 wherein said member is said alcoholate and subsequent to said contacting any excess of said alcohol present is separated from said reaction mixture leaving an alcohol-free reaction mixture then filtering said alcohol-free reaction mixture and recovering said filtrate as said lubricating oil concentrate.

7. A method in accordance with claim 6 wherein during said contacting at least part of any excess of said alcohol is removed via distillation.

8. A method in accordance with claim 7 wherein said lubricating oil is mineral lubricating oil of an SUS viscosity between about 50 and 300 at 100° F., $R^1$ and $R^4$ are hydrogen, $R^2$ and $R^3$ are $C_{10}$–$C_{12}$ alkyl, said $R^6$ is $CH_3$ and said $R^7$ is $CH_2CH_2$.

9. A method of producing a lubricating composition containing a calcium salt of a 2:2:1 mole ratio condensation product of alkylphenol-formaldehyde-diaminoalkane characterized by the formula:

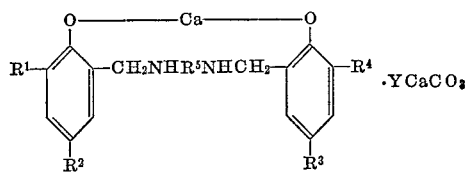

where $R^1$ and $R^4$ are hydrogen or alkyl of from 1 to 30 carbons, $R^2$ and $R^3$ are alkyl of from 4 to 30 carbons, $R^5$ is polymethylene of from 2 to 6 carbons, Y is an integer of from greater than 0 to 5 comprising contacting a mixture of (a) said condensation product characterized by the formula:

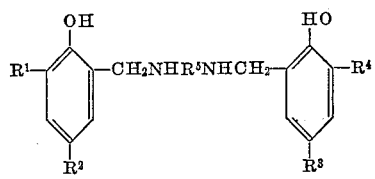

where $R^1$, $R^2$, $R^3$, $R^4$ and $R^5$ are as heretofore defined, and (b) calcium carbide and an alcohol of the formula $R^6OR^7OH$ or an alcoholate of the formula $Ca(OR^7OR^6)_2$ where $R^6$ is alkyl of from 1 to 3 carbons, and $R^7$ is polymethylene of from 2 to 4 carbons in the presence of between about 1 and 10 wt. percent water and between about 10 and 70 wt. percent lubricating oil with carbon dioxide utilizing a mole ratio of calcium carbide to said condensation product of between 2:1 and 6:1, a mole ratio of said $CO_2$ to calcium carbide greater than about 2:1 and a mole ratio of said alcohol to said condensation product of between about 1:1 and 20:1, said alcoholate being prepared by reacting said calcium carbide with said alcohol.

10. A method according to claim 9 wherein said "b" is said alcoholate and said alcoholate is first contacted with $CO_2$ prior to incorporation in said mixture.

References Cited

UNITED STATES PATENTS

| | | | |
|---|---|---|---|
| 2,341,565 | 2/1944 | Lyman et al. | 260—632 XR |
| 2,353,491 | 7/1944 | Oberright | 252—42.7 |
| 2,725,357 | 11/1955 | Kluge et al. | 252—42.7 |
| 3,009,964 | 11/1961 | Russell | 260—632 |
| 3,236,770 | 2/1966 | Matson et al. | 252—42.7 XR |
| 2,892,782 | 6/1959 | Caffrey | 252—42.7 |
| 2,870,134 | 1/1959 | Kluge et al. | 252—42.7 XR |

DANIEL E. WYMAN, Primary Examiner.

W. H. CANNON, Assistant Examiner.

U.S. Cl. X.R.

260—571